United States Patent [19]

Schimmel

[11] Patent Number: 4,774,005

[45] Date of Patent: Sep. 27, 1988

[54] PROCESS FOR WORKING-UP AN AQUEOUS SILICOHYDROFLUORIC ACID SOLUTION

[75] Inventor: Günther Schimmel, Erftstadt, Fed. Rep. of Germany

[73] Assignee: Hoechst Aktiengesellschaft, Frankfurt am Main, Fed. Rep. of Germany

[21] Appl. No.: 76,340

[22] Filed: Jul. 22, 1987

[30] Foreign Application Priority Data

Aug. 5, 1986 [DE] Fed. Rep. of Germany ....... 3626448

[51] Int. Cl.$^4$ .............................................. B01D 21/01
[52] U.S. Cl. .................................. 210/721; 210/724; 210/737; 210/768; 210/774
[58] Field of Search ............... 210/749, 751, 729, 702, 210/710, 719, 721, 723, 724, 737, 738, 725, 727–730, 767, 768, 774, 803; 423/335, 338, 483, 490

[56] References Cited

U.S. PATENT DOCUMENTS

| | | |
|---|---|---|
| 3,907,978 | 9/1975 | Spreckelmeyer . |
| 3,971,845 | 7/1976 | Becker et al. . |
| 4,031,193 | 6/1977 | Becker et al. ............... 423/335 |
| 4,078,043 | 3/1978 | Becker et al. ............... 423/338 |

Primary Examiner—Frank Sever

[57] ABSTRACT

An aqueous solution of hexafluorosilicic acid containing 2 to 15 wgt % $H_2SiF_6$ is worked up. To this end, the solution is admixed with particulate $CaCO_3$ or $Ca(OH)_2$ consisting to an extent of at least 70% of particles having a size of more than 8 μm, but to an extent of at most 15% of particles having a size of more than 2 mm, or with $CaCO_3$ in admixture with $CaO$ or $Ca(OH)_2$. The calcium compound is used in a quantity sufficient to establish a molar ratio of $Ca^{2+}/SiF_6^{2-}$ of 2.8 to 3.5, and the reaction is effected at a temperature higher than 50° C. After a period of 0.6 to 2.5 hours, the reaction product is filtered.

6 Claims, No Drawings

PROCESS FOR WORKING-UP AN AQUEOUS SILICOHYDROFLUORIC ACID SOLUTION

This invention relates to a process for working-up an aqueous solution of hexafluorosilicic acid by admixing and reacting the solution with a calcium compound, and filtering the reaction product.

Aqueous solutions containing $H_2SiF_6$ are obtained e.g. in processes in which off-gas containing HF or $SiF_4$ is scrubbed with water. These processes occur more especially in phosphoric acid production facilities in which crude phosphate containing apatite and $SiO_2$ is processed using a mineral acid, especially sulfuric acid.

As regards $H_2SiF_6$, it is possible for its concentration to be varied within the range 2–25% by recycling the scrubbing water more or less frequently. Needless to say the expenditure for gas scrubber equipment increases with an increasing concentration to have off-gas sufficiently freed from fluorine.

As results from the stoichiometry of the following equations $$SiF_4 + 2\,HF \rightleftharpoons H_2SiF_6$$

$$3\,SiF_4 + 2\,H_2O \rightarrow 2\,H_2SiF_6 + SiO_2$$

it is possible for the $H_2SiF_6$-solution to contain free HF or $SiO_2$. It is also possible for it to contain traces of carried over droplets of phosphoric acid.

In view of their acidity and fluorine content, it is not allowable for the hexafluorosilicic acid solutions obtained to be delivered into the waste water system direct. In fact, two methods have been tried for work-up:

1. The recovery of the F and $SiO_2$-values from these solutions. Various processes for recovering $AlF_3$, HF, $CaF_2$ or $SiO_2$ have been disclosed e.g. in British Specification Nos. GB-A1 079 665 and German Specification Nos. DE-A-22 48 149, DE-C-24 07 238, DE-A-23 07 897.

2. If the conversion to useful products is a commercially unattractive procedure it is necessary for the $H_2SiF_6$ to be transformed to ecologically reliable material.

To this end, it is good practice to subject $H_2SiF_6$ to reaction with a calcium compound in accordance with one of the following equations which depend on the stoichiometry, temperature conditions and pH selected:

$$H_2SiF_6 + CaCO_3 \rightarrow CaSiF_6 + H_2O + CO_2 \quad (1)$$

$$H_2SiF_6 + 3\,CaCO_3 \rightarrow 3\,CaF_2 + SiO_2 + H_2O + 3\,CO_2 \quad (2)$$

$$H_2SiF_6 + 3\,Ca(OH)_2 \rightarrow 3\,CaF_2 SiO_2 + 4\,H_2O \quad (3)$$

In equation (1), $H_2SiF_6$ is just neutralized and a solution containing a good deal of F is obtained, owing to the high solubility of $CaSiF_6$. In equation (2), the $H_2SiF_6$ undergoes complete reaction to $CaF_2$ and $SiO_2$. To this end, it is however generally necessary to use slightly more than 3 mols $Ca^{2+}$ (cf. European Specification No. EP-B-39 324), and the reaction additionally raises a problem in the following respects: 1. In the event of $CaCO_3$ being used in a stoichiometric deficiency or at temperatures lower than 40° C. cf. German Specification No. DE-A-2 307 897 and Examples 1 and 2 herein), the $SiO_2$ remains dissolved and in fact considerably affects the separation of $CaF_2$ by brine or gel formation.

2. In clear contrast with the reaction of equation (3), the reaction in equation (2) possesses a positive reaction enthalpy, i.e. it is an endothermal reaction. Well then, whenever the $H_2SiF_6$ coming from the process has a temperature lower than 50° C., the suspension is liable to undergo cooling during neutralizing it with $CaCO_3$ with the result that there either occurs the $SiO_2$-gel formation aforesaid or a suspension of considerably poorer filterability is obtained. This is a clear indication to the artisan what importance has to be attributed to filterability-improving steps.

The reaction in equation (3) would appear to come rather close to the goal aimed at, namely to have a complete reaction and obtain a readily filterable suspension. Indeed however the process is not free from disadvantages which reside in the formation of filter cakes which contain heavy quantities of water and therefore present relatively high densities and volumes. In addition, $Ca(OH)_2$ is the most expensive representative in the following product chain:

$$CaCO_3 \rightarrow CaO \rightarrow Ca(OH)_2$$

It is therefore desirable to have a process which is free from the deficiencies of prior processes, complies with the following specifications, and provides:

1. for a minimum quantity of lime based on $H_2SiF_6$ to be used;
2. for fairly inexpensive Ca-chemicals to be used;
3. for a $H_2SiF_6$/lime-suspension easy to filter and substantially not liable to deposit in the reactor to be obtained;
4. for a maximum filtration output to be achieved during the separation of $CaF_2/SiO_2$;
5. for a minimum relative quantity of filter cake containing little water to be obtained;
6. for the filter cake to be friable rather than thixotropic;
7. for the waste water, i.e. filtrate, to contain little $SiO_2$ and very little F, possibly less than 200 ppm;
8. for the inherent risk of silica brine-formation to be substantially avoided.

This can unexpectedly be achieved by combining a series of processing steps which comprise:

(a) using a solution containing 2–15 wgt % $H_2SiF_6$;

(b) using, as the calcium compound, particulate $CaCO_3$ or $Ca(OH)_2$ consisting to an extent of at least 70% of particles having a size of more than 8 μm, but to an extent of at most 15% of particles having a size of more than 2 mm, or of $CaCO_3$ in admixture with at least 2 wgt % CaO or $Ca(OH)_2$;

(c) using the calcium compound in a quantity sufficient for establishing a $Ca^{2+}/SiF_6^{2-}$-molar ratio of 2.8 to 3.5;

(d) effecting the reaction at a temperature higher than 50° C.; and (e) filtering the reaction product after a period of 0.6 to 2.5 hours.

Preferred features of the process of this invention provide:

(f) for a solution containing 6–10 wgt % $H_2SiF_6$ to be used;

(g) for the calcium compound to be used in a quantity sufficient for establishing a $Ca^{2+}/SiF_6^{2-}$-molar ratio of 3.0 to 3.45; and (h) for the reaction to be effected at a temperature of 50°–80° C.

As already reported herein, it is possible for whatever $H_2SiF_6$-concentration up to about 25 wgt % to be established in a $H_2SiF_6$-solution coming from the off-gas scrubbing stage of a phosphoric acid production facility. The expenditure for the gas scrubbing increases however with an increasing concentration. As we have now found, it is invariably necessary for effecting the reaction with the calcium compound under commercial conditions and subsequently separating a filtrate practically free from fluorine to use a solution containing at most 15 wgt % $H_2SiF_6$ (cf. Example 8 herein). Concentrations higher than just specified should suitably not be used as (a) the suspension is then no longer stirrable and (b) the reaction so poor that filtrate containing excessive fluorine is obtained. Optimum results are generally obtained using a solution containing 6–10 wgt % $H_2SiF_6$.

Pure $CaCO_3$ should reasonably not be selected as the calcium compound, for the reasons already indicated above. Generally good results are obtained with lime hydrate $Ca(OH)_2$. Critically also resides in the particle size of the $CaCO_3$ and $Ca(OH)_2$. Commercially available white lime hydrates customarily consist of particles very small in size and the reaction fails to produce fully satisfactory results. As compared therewith, the use of lime hdyrates consisting to an extent of more than 70% of particles with a size of more than 8 $\mu$m (determined on a "Microtrac particle size analyzer) has been found to entail a series of advantageous effects:

(a) The output during the filtration of the $CaF_2/SiO_2$-suspension is comparatively higher.

(b) The filter cake contains lesser water, and less waste material has to be disposed of.

(c) The F-content in the final filtrate is lower, for the use of otherwise identical molar quantities of Ca.

Lime hydrates of the kind described are obtained, e.g. on subjecting CaC to dry-slaking (slaking with steam) or as a by-product in the lime industries which may naturally have some unburnt lime contained in it.

Positive results similar to those obtained with the hydrates of lime described are produced by reacting $H_2SiF_6$ with ground limestone ($CaCO_3$) subject to the following conditions which provide:

(a) for the limestone to consist to an extent of more than 70% of particles having a size of more than 8 $\mu$m;

(b) for the $H_2SiF_6$ admitted to the reactor to have a temperature of more than 50° C. to obtain a readily filterable suspension free from silica gel, despite the endothermal reaction;

(c) for the $Ca^{2+}/SiF_6^{2-}$-ratio selected to be higher than 3:1.

It is particularly advantageous to use the $CaCO_3$-powder in admixture with CaO or $Ca(OH)_2$ as this has three additional beneficial effects; (1) the additional reaction enthalpy causes the forming suspension to be heated; (2) the $CaF_2/SiO_2$-filter cake has an altogether more solid, friable consistency and is easier to remove from the filter cloth; (3) the particle fineness of the $CaCO_3$ is less critical. Still further, the filtration output increases distinctly, and the filter cloth is substantially not liable to become clogged with silica brine or finest solid particles.

The two components making the mixture can also be admitted separately. More specifically, it is possible to introduce the two Ca-components into a sole reactor, or in a two stage-operation into a series of agitator-provided containers in cascade arrangement, with the $CaCO_3$ being added during the first stage and the $Ca(OH)_2$ or CaO being added during the second.

The feed components should conveniently remain in the reactor over a period of 0.5–2 hours after mixing; shorter as well as longer periods result in increased soluble fluoride contents.

The following Examples illustrate the invention which is naturally not limited thereto.

EXAMPLES 1–7

A heatable stainless steel container (volume = 1 liter) provided with a stirrer and an overflow was fed per hour with about 500 ml $H_2SiF_6$ (6 wgt %) admitted by means of a dosing pump together with the corresponding quantity of a pulverulent Ca-compound admitted by means of a dosing screw. The resulting suspension was maintained at 70° C. by heating from the outside. The overflow of 4 hours was discarded, and the suspension flowing over thereafter was collected for 2 hours, maintained at 70° C. and filtered off using a heated pressure filter (3 bars) having a filter surface area of 125 cm². There were determined: the filtration period, filtrate weight, weight of filter cake, moisture content of cake and F- and $SiO_2$-contents of filtrate.

The test parameters and results obtained are indicated in Table 1. The lime data are indicated in Table 2.

EXAMPLES 8 AND 9

The procedure of Example 6 was modified by using feed solutions containing 18 and 9 wgt % respectively, of $H_2SiF_6$. The 18 wgt % solution gave a mixture of pasty consistency which was scarcely flowable.

EXAMPLES 10–14

In contrast with Examples 1–9, the reaction was effected in a heated 40-liter container into which the feed components were continuously introduced. The suspension travelled through an overflow into a heated agitator-provided container having a volume of 200 liter in which it was collected. After about 180 liter $H_2SiF_6$ had been put through, the suspension was admitted to a vacuum rotatory filter provided with a running cloth of 0.25 m² filter surface area. The filtrate was collected, the cake was taken continuously and also collected.

EXAMPLE 15

The experiment described in Example 10 was repeated; the filtration again was absolutely poor. The entire suspension was admixed at once with 1.5 kg $Ca(OH)_2$ (A), the whole was sitrred at 70° C. and again filtered by means of the rotatory filter. The filtration output was very good (>1.3 m³/m²h). The filtrate contained 30 ppm F and the filter cake contained 43% $H_2O$. This Example shows that the lime mixture of this invention can also be made by subsequently adding one of the two components to the component initially charged.

TABLE 1

| | | | | Filtrate | | Filtercake | | Filtration | |
| | H$_2$SiF$_6$ | | Ca:H$_2$SiF$_6$ | | | | Quantity | output | |
| Ex. | (kg/h) | Ca—source | (molar) | ppm F | ppm SiO$_2$ | % H$_2$O | in %/H$_2$SiF$_6$ | (m$^3$/m$^2$h) | observations |
|---|---|---|---|---|---|---|---|---|---|
| 1 (comp.) | 0.645 | CaCO$_3$ (A) | 2.51 | 15000 | 8800 | 35.5 | 139 | 0.50 | |
| 2 (comp.) | 0.634 | CaCO$_3$ (A) | 3.54 | 69 | 1800 | 62.3 | 591 | 0.14 | reaction at 40° C. |
| 3 | 0.620 | CaCO$_3$ (A) | 3.05 | 143 | 34 | 34.9 | 325 | 3.60 | |
| 4 (comp.) | 0.551 | CaCO$_3$ (B) | 3.19 | 166 | 38 | 36.2 | 305 | 0.80 | |
| 5 (comp.) | 0.512 | Ca(OH)$_2$ (B) | 3.31 | 181 | 180 | 58.8 | 659 | 2.70 | |
| 6 | 0.546 | Ca(OH)$_2$ (A) | 3.01 | 130 | 170 | 29.6 | 314 | 3.20 | |
| 7 | 0.562 | Ca(OH)$_2$ (C) | 3.13 | 97 | 220 | 35.0 | 281 | 3.90 | |
| 8 (comp.) | 0.570 | Ca(OH)$_2$ (A) | 3.05 | 2000 | 1300 | 32.5 | 335 | 0.06 | H$_2$SiF$_6$ with 18 wgt % |
| 9 | 0.572 | Ca(OH)$_2$ (A) | 2.95 | 249 | 180 | 36.2 | 360 | 3.30 | H$_2$SiF$_6$ with 9 wgt % |
| 10 (comp.) | 55 | CaCO$_3$ (B) | 3.22 | 65 | n.d. | n.d. | 280 | <0.1 | filter cloth continuously coated with greasy film |
| 11 | 52 | CaCO$_3$ (B) 95% Ca(OH)$_2$ (A) 5% | 3.45 | 130 | n.d. | 39.5 | 341 | >1.3 | |
| 12 | 52 | CaCO$_3$ (B) 95% CaO 5% | 3.48 | 68 | n.d. | 43.5 | 395 | >1.3 | |
| 13 | 56 | Ca(OH)$_2$ (A) | 3.57 | 60 | n.d. | 39.0 | 264 | 1.0 | |
| 14 | 61 | CaCO$_3$ (B) 95% Ca(OH)$_2$ (A) 5% | 3.36 | 65 | n.d. | 40.0 | 275 | 0.9 | H$_2$SiF$_6$ with 10 wgt % |

TABLE 2

| | Analysis Ca—chemicals | | | | |
| | % | % | Screen analysis | | |
| Compound | CaO | CO$_2$ | % > 8 μm | % > 2 mm | Method |
|---|---|---|---|---|---|
| CaCO$_3$ (A) | 54.5 | 45.4 | 75.5 | 0 | a |
| CaCO$_3$ (B) | 53.5 | 45.0 | 56.5 | 0 | a |
| Ca(OH)$_2$ (A) | 68.5 | 3.1 | 75.1 | 0 | b |
| Ca(OH)$_2$ (B) | 69.1 | 2.6 | 19.8 | 0 | b |
| Ca(OH)$_2$ (C) | 73.2 | 1.2 | 72.7 | 10.3 | c |
| CaO | 96 | 2.5 | 52.3 | 0 | b |

Screen analysis operations:
a: "Microtrac Particle Size Analyzer" in water
b: "Microtrac Particle Size Analyzer" in kerosene
c: conventional screen analysis; 1st value = % > 100 μm

I claim:

1. In the process for working up an aqueous solution of hexafluorosilicic acid by mixing the said solution with a calcium compound and reacting the mixture and filtering the reaction product, the improvement which comprises the combination of steps:

(a) using a solution containing 2 to 15 wgt % H$_2$SiF$_6$;

(b) using, as the calcium compound, particulate CaCO$_3$ or Ca(OH)$_2$ consisting essentially to an extent of at least 70% of particles having a size of more than 8 μm, but to an extent of at most 15% of particles having a size of more than 2 mm, or of CaCO$_3$ in admixture with at least 2 wgt % CaO or Ca(OH)$_2$;

(c) using the calcium compound in a quantity sufficient to establish a molar ratio of Ca$^{2+}$/SiF$_6^{2-}$ of 2.8 to 3.5;

(d) effecting the reaction at a temperature higher than 50° C.; and (e) filtering the reaction product after a period of 0.6 to 2.5 hours.

2. The process as claimed in claim 1, wherein a solution containing 6 to 10 wgt % of H$_2$SiF$_6$ is used.

3. The process as claimed in claim 1, wherein the calcium compound is used in a quantity sufficient to establish a molar ratio of Ca$^{2+}$/SiF$_6^{2-}$ of 3.0 to 3.45.

4. The process as claimed in claim 1, wherein the reaction is effected at a temperature of 50 to 80° C.

5. The process as claimed in claim 1, wherein the calcium compound is essentially particular CaCO$_3$ or particulate Ca(OH)$_2$.

6. The process as claimed in claim 1, wherein the calcium compound is an admixture consisting essentially of CaCO$_3$ and at least 2 weight-% CaO or Ca(OH)$_2$.

* * * * *